(12) United States Patent
Dauplay

(10) Patent No.: US 6,722,093 B2
(45) Date of Patent: Apr. 20, 2004

(54) BAMBOO TILE AND METHOD FOR MANUFACTURING THE SAME

(76) Inventor: Gerard Dauplay, 5048, Ave Notre-Dame-de-Grâce, Montreal, QBC (CA), H4A 1K1

( * ) Notice: Subject to any disclaimer, the term of this patent is extended or adjusted under 35 U.S.C. 154(b) by 87 days.

(21) Appl. No.: 10/055,979

(22) Filed: Jan. 28, 2002

(65) Prior Publication Data
US 2003/0143360 A1 Jul. 31, 2003

(51) Int. Cl.[7] .................................................. E04C 2/16
(52) U.S. Cl. ............................ 52/314; 52/313; 52/391
(58) Field of Search ........................... 52/313, 314, 391

(56) References Cited

U.S. PATENT DOCUMENTS

| | | | | |
|---|---|---|---|---|
| 4,860,510 A | * | 8/1989 | Kotler | ........................... 52/177 |
| 5,441,787 A | | 8/1995 | Fujii et al. | |
| 5,456,964 A | | 10/1995 | Tamura et al. | |
| 5,543,197 A | | 8/1996 | Plaehn | |
| 5,814,170 A | | 9/1998 | Shibusawa et al. | |
| 5,834,081 A | * | 11/1998 | Fanti | ........................... 428/44 |
| 5,896,903 A | | 4/1999 | Chen et al. | |
| 5,967,207 A | | 10/1999 | Chen | |
| 5,972,467 A | | 10/1999 | Washo | |
| 5,976,644 A | | 11/1999 | Sanaee et al. | |
| 6,129,967 A | * | 10/2000 | Young et al. | .................. 428/49 |
| 6,330,774 B1 | * | 12/2001 | Weinstein | ..................... 52/314 |

FOREIGN PATENT DOCUMENTS

| | | |
|---|---|---|
| EP | 0864020 B1 | 4/2000 |
| JP | 07285105 A2 | 10/1995 |
| JP | 10156805 A2 | 6/1998 |

* cited by examiner

*Primary Examiner*—Carl D. Friedman
*Assistant Examiner*—Basil Katcheves

(57) ABSTRACT

A bamboo tile for decoratively covering a structure wall in a side-by-side arrangement and presenting a natural surface texture of a longitudinal section of a bamboo stem with at least one circular node, while minimizing the amount of bamboo waste. The bamboo tile includes a first generally planar layer formed by elongated sectors axially split from the bamboo stem and sequentially disposed in generally parallel relationship relative to each other to integrally reproduce the natural texture of the outside cylindrical surface of the bamboo stem section developed there into. A retaining wire inserted into transversal and registered through bores made into the successive sectors maintains the latter in the sequential relationship relative to each other. The present invention also refers to a method for manufacturing the above bamboo tile.

21 Claims, 3 Drawing Sheets

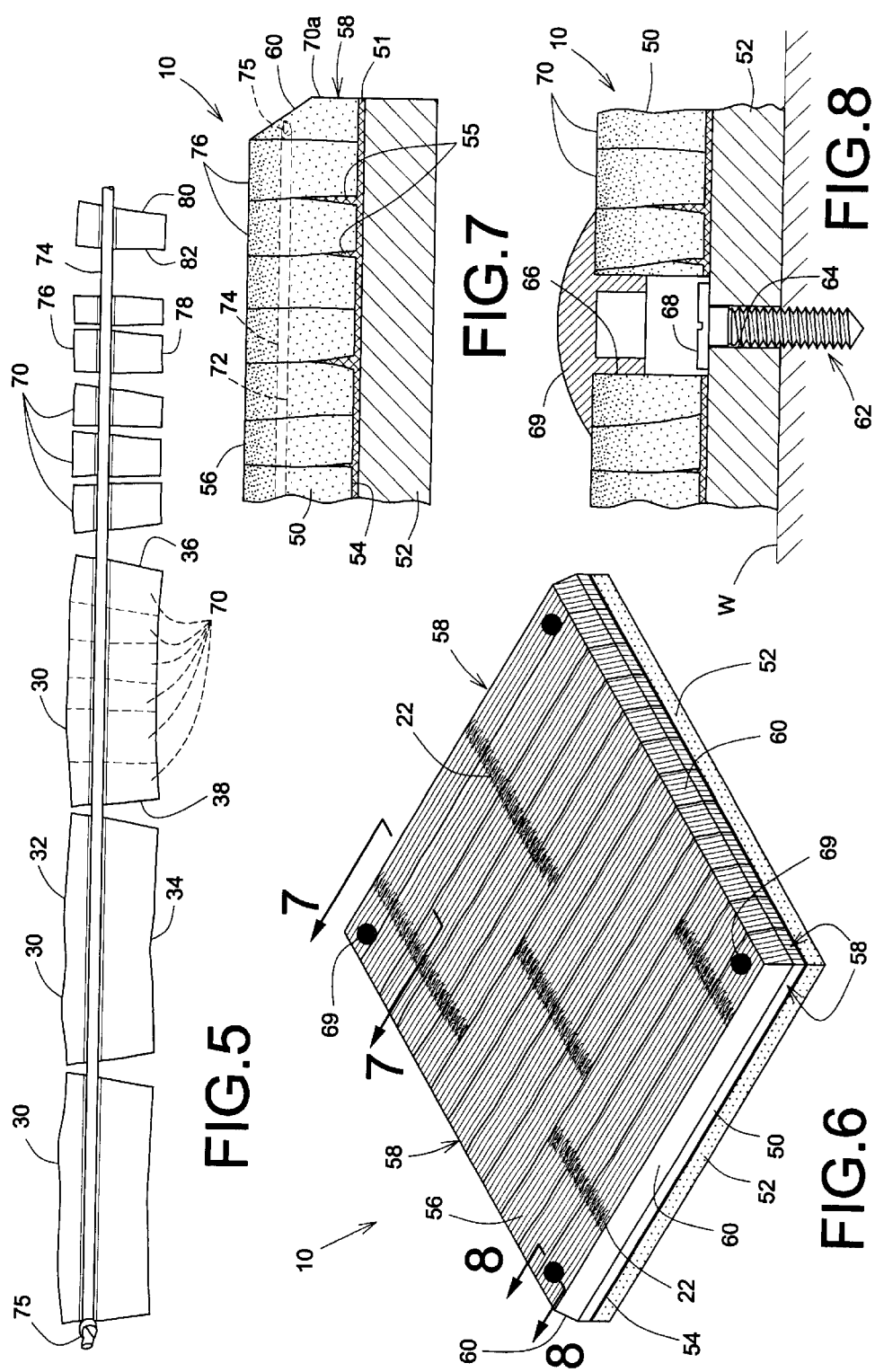

BAMBOO TILE AND METHOD FOR MANUFACTURING THE SAME

FIELD OF THE INVENTION

The present invention relates to materials used in furniture manufacturing and building construction, and more particularly, to a bamboo tile presenting a natural bamboo-like appearance for covering a structure wall and the method for manufacturing the same.

BACKGROUND OF THE INVENTION

Bamboo has been extensively used so far, especially in the manufacturing of a wide variety of products in forming either a structural part or an exotic external finish thereof.

More recently, bamboo tiles were developed using slabs of bamboo machined out from sections of natural bamboo stems. These slabs, as those illustrated in European Patent No. EP 0 864 020 B1 issued to Simon et al. on Sep. 16, 1998, form at least two layers in the construction of the tiles and are positioned in a staggered relationship relative to the adjacent ones by taking into consideration the density of the wood fibers and the associated bending stresses built-in the raw product. Each of these slabs is faced out and machined on all surfaces to all have the same generally rectangular cross-section and same dimensions. They are assembled side by side in a random fashion since they are essentially identical to the others in shape and fiber density. In other words, all slabs are interchangeable.

Similarly, U.S. Pat. No. 5,976,644 issued to Sanaee et al. on Nov. 2, 1999 also discloses bamboo slabs with squared edges used in the fabrication of bamboo articles made out of a plurality of layers of slabs such as veneers, boards and the like.

By using squared slabs of bamboo as shown in the prior art, it is not possible to render the natural aspect of the bamboo stem external surface on a tile, since part of the stem is wasted during the facing, or squaring process, of the slabs. Adjacent slabs are therefore not a continuity of each other, as required to fully represent the bamboo stem external surface.

The fact that the natural aspect of the bamboo is preserved, the thickness of a same "natural" slab usually varies through its length and width, and the thickness of the external layer of a tile, made out of a plurality of "natural" slabs positioned in a parallel relationship relative to each other, continuously varies in any planar direction. These non-uniform thicknesses of the different decorative tiles are not proper for their side-by-side positioning on a structure wall or the like since they would generate discontinuities at their mutual interfaces that would not be eye-attractive for the arrangement of the decorative tiles.

SUMMARY OF THE INVENTION

It is therefore a general object of the present invention to provide a bamboo tile that obviates the above-mentioned disadvantages.

An advantage of the present invention is that the bamboo tile provides a preserved natural aspect of the bamboo with nice external appearance that can be mounted in a side-by-side arrangement with similar tiles even though its thickness is not uniform over its entire surface.

A further advantage of the present invention is that the manufacturing of the bamboo tile significantly reduces the amount of bamboo waste.

Still another advantage of the present invention is that the bamboo tile is relatively simple to manufacture compared to existing bamboo tile products.

Yet another advantage of the present invention is that the bamboo tile can be produced in various shapes and dimensions to suit a wide variety of applications, from covering furniture surfaces to building wall and even ceiling and the like.

Furthermore, the proposed bamboo tile can be easily mounted on the supporting structure without requiring special tooling or manual dexterity.

Still furthermore, the proposed bamboo tile can easily be tinted or varnished according to the need of the specific arrangement.

According to an aspect, the present invention consists of a bamboo tile for covering a structure wall and presenting a natural surface texture of a longitudinal section of a bamboo stem with at least one node, the section defining generally cylindrical outside and inside surfaces and a generally central axis, the section being axially split into a plurality of sequential and adjacent generally elongated sectors, each sector having a generally parallelepiped-shaped configuration and defining a sector first main surface, a sector second main surface, a sector first auxiliary surface, an opposed sector second auxiliary surface, a sector first side surface, an opposed sector second side surface and a sector longitudinal axis, the bamboo tile comprises:

a first layer defining opposed generally planar internal and external surfaces, the first layer being formed by the elongated sectors sequentially disposed in generally parallel relationship relative to each other with the sector first auxiliary surface of each sector being in abutment contact with the sector second auxiliary surface of an adjacent sector, the external surface being formed by the sector first main surfaces of the sectors positioned to integrally reproduce the natural texture of the outside cylindrical surface of the bamboo stem section developed into the generally planar external surface, each of the sectors defining at least one through bore extending from the sector first auxiliary surface to the sector second auxiliary surface, the through bores of the adjacent sectors being substantially in register with each other a retaining wire inserted into the through bores of the successive sectors to maintain the sectors in the sequential relationship relative to each other so as to allow the generally planar external surface to integrally reproduce the natural texture of the outside cylindrical surface of the bamboo stem section developed thereinto.

Typically, the tile further includes:

a second layer bonded on the internal surface of the first layer, the second layer supporting the first layer so as to rigidify the bamboo tile, the first and second layers defining common peripheral surfaces; and a chamfer extending between the external surface of the first layer and one of the peripheral surfaces.

Conveniently, the chamfer extends between the external surface of the first layer and two of the peripheral surfaces, opposed to each other.

Preferably, the chamfer extends between the external surface of the first layer and the peripheral surfaces.

Conveniently, each sector defines a sector thickness between the sector first main surface and the sector second main surface, the sector thickness continuously varying along the peripheral surfaces of the bamboo tile.

Conveniently, each sector defining a sector width between the sector first auxiliary surface and the sector second auxiliary surface, the sector width varying between about 1 mm and about 10 mm, preferably between about 2 mm and about 5 mm.

Preferably, the bamboo tile has a generally square-shaped or rectangle-shaped configuration.

According to another aspect, the present invention consists of a method for manufacturing a bamboo tile for covering a structure wall, the bamboo tile presenting a natural surface texture of a longitudinal section of a bamboo stem with at least one node, the section defining generally cylindrical outside and inside surfaces and a generally central axis, the method minimizes the amount of bamboo waste and comprises the steps of:

a) axially splitting the section into a plurality of sequential and adjacent generally elongated sectors, each sector having a generally parallelepiped-shaped configuration and defining a sector first main surface, a sector second main surface, a sector first auxiliary surface, an opposed sector second auxiliary surface, a sector first side surface, an opposed sector second side surface and a sector longitudinal axis;

b) sequentially disposing the elongated sectors in parallel relationship relative to each other with the sector first auxiliary surface of each sector being in abutment contact with the sector second auxiliary surface of art adjacent sector to form a tile first layer, the first layer defining opposed generally planar internal and external surfaces, the external surface being formed by the sector first main surfaces of the sectors positioned to integrally reproduce the natural texture of the outside cylindrical surface of the bamboo stem section developed into the generally planar external surface;

c) bonding the internal surface of the first layer on a tile second layer, the second layer supporting the first layer so as to rigidify the bamboo tile, the first and second layers defining common peripheral surfaces; and d) making a chamfer between the external surface of the first layer and one of the peripheral surfaces.

Preferably, the step d) includes making a chamfer between the external surface of the first layer and the peripheral surfaces.

Preferably, each of the sectors defines at least one through bore extending from the sector first auxiliary surface to the sector second auxiliary surface, the through bores of the adjacent sectors being substantially in register with each other, the step b) comprises the steps of:

b1) inserting a retaining wire through the through bores of the successive sectors to maintain the sectors in the sequential relationship relative to each other;

b2) axially splitting each elongated sector into a plurality of sequential and adjacent generally elongated sub-sectors, each sub-sector having a generally parallelepiped-shaped configuration and defining a sub-sector first main surface, a sub-sector second main surface, a sub-sector first auxiliary surface, an opposed sub-sector second auxiliary surface, a sub-sector first side surface and an opposed sub-sector second side surface, the sub-sectors being maintained in sequential and substantially parallel relationship relative to each other by the retaining wire; and b3) sequentially disposing the elongated sub-sectors in parallel relationship relative to each other with the sub-sector first auxiliary surface of each sub-sector being in abutment contact with the sub-sector second auxiliary surface of an adjacent sub-sector to form the tile first layer, the external surface being formed by the sub-sector first main surfaces of the sub-sectors positioned to integrally reproduce the natural texture of the outside cylindrical surface of the bamboo stem section developed into the generally planar external surface.

Preferably, the step c) includes facing the internal surface of the first layer so as to ensure a generally flat internal surface prior to bonding the internal surface of the first layer on a tile second layer.

Preferably, the method further comprises the steps of:

e) sanding and/or drying the bamboo tile.

f) finishing the first layer external surface of the bamboo tile by applying tinting and/or varnishing agent thereon.

Conveniently, the step a) includes facing out the node on the sector first main surface of each elongated sector so as to render the sector first main surface substantially flat.

Conveniently, the step c) includes trimming the peripheral surfaces of the tile to the required dimensions thereof.

Other objects and advantages of the present invention will become apparent from a careful reading of the detailed description provided herein, with appropriate reference to the accompanying drawings.

BRIEF DESCRIPTION OF THE DRAWINGS

In the annexed drawings, like reference characters indicate like elements throughout.

FIG. 5 is a transversal elevational view, showing sectors and sub-sectors linked in a parallel relationship relative to each other using a retaining wire;

FIG. 6 is a front perspective view of an embodiment of a bamboo tile in accordance with the present invention; and FIGS. 7 and 8 are enlarged partial section views taken along line 7—7 and line 8—8 of FIG. 6, respectively.

DETAILED DESCRIPTION OF THE PREFERRED EMBODIMENTS

With reference to the annexed drawings the preferred embodiments of the present invention will be herein described for indicative purposes and by no means as of limitation.

Figure 1:
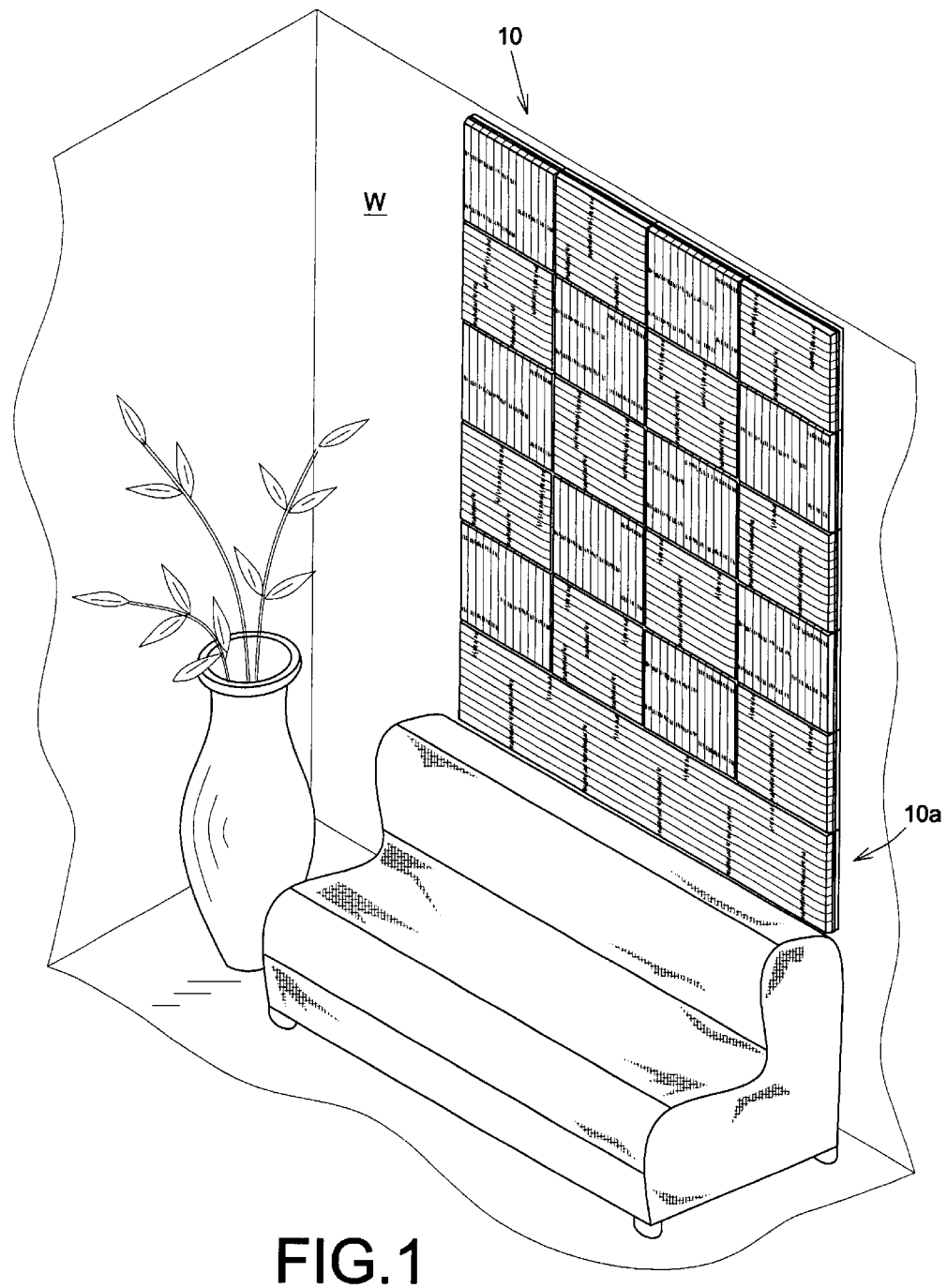
FIG. 1 is a front perspective view, showing a decorative arrangement of an embodiment of a bamboo tile according to the present invention mounted on a structure wall.

Referring to FIG. 1, there is shown a typical side-by-side arrangement of a plurality of an embodiment 10 of decorative bamboo tiles in accordance with the present invention covering a structure wall W. The bamboo tiles 10 reproduce the natural aspect of bamboo including the typical circular nodes associated therewith. In the arrangement of FIG. 1, the tiles 10 are oriented in a staggered configuration with some tiles representing vertical bamboo stems "unfolded" from left to right and others representing horizontal bamboo stems "unfolded" from up to down. The structure wall W could be part of a furniture, side peripheral wall or ceiling of a building, or any similar type of a generally flat structure.

Figure 2:
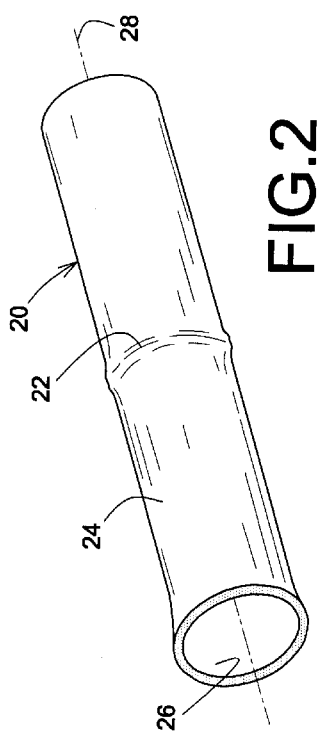
FIG. 2 is a front perspective view, showing a section of a bamboo stem used for the manufacturing of a bamboo tile according to the present invention and having at least on node therein.
Figure 3:
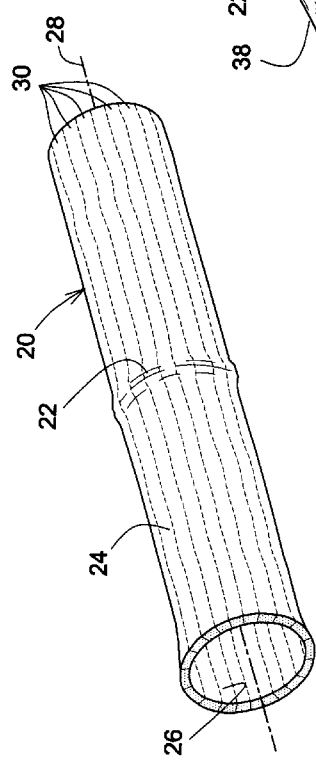
FIG. 3 is a view similar to FIG. 2, showing how the section is split into a plurality of elongated sectors.

Referring to FIGS. 2 and 3, there is shown a section 20 of a bamboo stem with a circular node 22 thereon used for the fabrication of each tile 10. The section 20 defines a generally cylindrical outside surface 24, an opposed inside surface 26 and a generally central axis 28. Although only one node is illustrated in FIGS. 2 and 3, it should be understood that more than one of such node 22 could be present on the section 20 without departing from the scope of the present invention, as illustrated in some of the tiles 10 in FIG. 1. Also, more than one section may be required to fit the dimension of a specific tile 10.

As more specifically shown in FIG. 3, the section 20 is axially split by cleavage or the like process using a cutting tool (not shown) such as an axe, machete or the like into a plurality of sequential and adjacent generally elongated sectors 30 without wasting any part thereof. Sectors 30 are essentially split or separated from adjacent ones along natural fibers of the bamboo stem.

Figure 4:
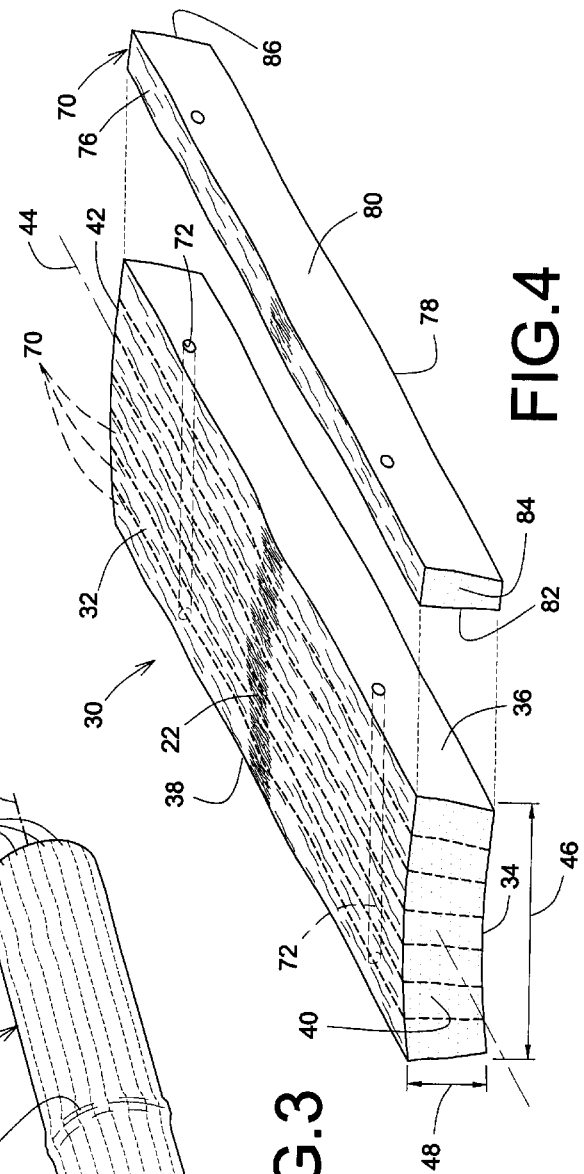
FIG. 4 is an exploded front perspective view, showing a bamboo sector and a sub-sector split therefrom.

As depicted on FIG. 4, each sector 30 substantially has a generally parallelepiped-shaped configuration and defines a sector first main surface 32, a sector second main surface 34, a sector first auxiliary surface 36, an opposed sector second auxiliary surface 38, a sector first side surface 40, an opposed sector second side surface 40 to and a sector longitudinal axis 44. The sector first and second main surfaces 32, 34 are therefore a small portion of the outside and inside surfaces 24, 26 of the section 20, respectively.

Since the sectors 30 are split along natural fibers of the bamboo stem, each sector 30 defines a sector first auxiliary surface-to-sector second auxiliary surface distance 46, or sector width, that generally continuously slightly varies along the length thereof. Furthermore, since the amount of waste is minimized to keep the natural aspect of the bamboo stem, each sector 30 defines a sector first main surface-to-sector second main surface spacing 48, or sector thickness, that continuously slightly varies across the sector 30 to account for the natural non-uniformity of the bamboo section 20.

As it is well known in the art, at each node location of a bamboo stem there is an internal membrane (not shown) that is obviously skimmed off from the sector second main surface 34 of each sector 30 in order to make the latter having a generally parallelepiped-shaped configuration. Also the very thin external skin, of green-like color, is generally scraped off the outside surface 24.

As better illustrated in FIGS. 6 and 7, the tile 10 includes a first layer 50 and second layer 52. The first layer 50 defines opposed an internal surface 54 and an external surface 56. The first layer 50 is formed by the elongated sectors 30 sequentially disposed in generally parallel relationship relative to each other with the sector first auxiliary surface 36 of each sector 30 being in abutment contact with the sector second auxiliary surface 38 of an adjacent sector 30, in the same sequential order they had when forming the bamboo section 20. The external surface 56 of the first layer 50 of the tile 10 is formed by the sector first main surface 32 of the sectors 30 positioned so as to substantially integrally reproduce at least a portion of the outside surface 24 of the bamboo stem section 20.

The second layer 52, made out of a generally rigid and flat material, is bonded on the internal surface 54 of the first layer 50, using well known wood-type glues 51 in the art, to support the latter so as to rigidify the bamboo tile 10 and ease its manipulation. The first 50 and second 52 layers of the tile 10 define common peripheral surfaces 58.

The tile 10 further includes a chamfer 60 extending between the external surface 56 of the first layer 50 and at least one, preferably all, of the peripheral surfaces 58. The chamfer 60 allows for the different tiles 10 of an arrangement as shown in FIG. 1 to be mounted side-by-side even though the adjacent tiles 10 do not have the same thickness, uniform or not, due to the varying thickness 48 of each sector 30 and to keep their eye-attractive surface finish look of natural bamboo. Obviously, the peripheral surfaces 58 not being part of an interface with an adjacent tile 10 do not have to be chamfered, depending on the desired look.

Since a typical bamboo section 20 has a relatively small diameter, in the order of a few inches or centimeters, the width 46 of each sector 30 needs to be relatively small to avoid too large convex and concave curvature of the sector first main surface 32 and sector second main surface 34, respectively. A concave sector second main surface 34 would necessitate an extensive facing operation thereon, and waste, prior to bonding to the second layer 50 of the tile 30. While a convex sector first main surface 32 would affect the natural bamboo aspect of the tile 30.

Accordingly, the width 46 of each sector 30 varies between one (1) and ten (10) millimeters, and preferably between two (2) and five (5) millimeters.

A tile attaching means for attaching the tile 10 to the structure wall W is preferably a bonding agent (not shown) such as glue or the like. Alternatively, the tile attaching means is typical screw fastener 62 as illustrated in FIG. 8. Each screw fastener 62 is adapted to engage a perpendicular through bore 64 made through the first 50 and second 52 layers of the tile 10. The through bore 64 defines a counter bore portion 66 thereof extending generally through the first layer 50. The counter bore portion 66 is configured and sized as to receive the head portion 68 of the screw fastener 62 therein. A bore cover 69 is preferably used to decoratively and fictionally close off the counter bore portion 66 of the bore 62.

In order to ensure the proper sequence of the sectors 30 and not lose or break any of them, the latter are typically first split with a width 46 approximately varying between ten (10) and twenty (20) millimeters. Before each sector 30 is individually split into a plurality of smaller sub-sectors 70, a retaining means is used for retaining and maintaining the sectors 30 in the sequential and substantially parallel relationship relative to each other.

Accordingly, each sector 30 preferably defines at least one transversal through bore 72 extending from the sector first auxiliary surface 36 to the sector second auxiliary surface 38, and substantially perpendicular thereto, as shown in FIGS. 4 and 5. The through bores 72 of adjacent sectors 30 are obviously substantially in register with each other. The retaining means is preferably a wire 74, such as a plastic wire or the like, slidably inserted through the through bores 72 of the successive sectors 30 so as to maintain them in the sequential relationship relative to each other, as shown in FIG. 5. The through bores 72 are preferably located as close as possible to the sector first main surface 32 of the sectors 30 in case some facing off the sector second main surface 34 would be required.

Once the sectors 30 are sequentially linked to each other via the retaining wire 74, they can easily be further axially split (also along the bamboo stem fibers) into the plurality of sequential and adjacent elongated sub-sectors 70, as illustrated in the right hand side portion of FIG. 4. As better shown in FIG. 3 exploded from the sector 30, each sub-sector 70 has a generally parallelepiped-shaped configuration and defines a sub-sector first main surface 76, a sub-sector second main surface 78, a sub-sector first auxiliary surface 80, an opposed sub-sector second auxiliary surface 82, a sub-sector first side surface 84 and an opposed sub-sector second side surface 86.

As explained hereinabove for the sectors 30, the sub-sectors 70 are sequentially in parallel relationship relative to each other with the sub-sector first auxiliary surface 80 of each sub-sector 70 being in abutment contact with the sub-sector second auxiliary surface 82 of an adjacent sub-sector 70 to form the tile first layer 50. The external surface 56 is then formed by the sub-sector first main surfaces 76 of the sub-sectors 70 positioned so as to substantially integrally reproduce at least a portion of the outside surface 24 of the bamboo stem section 20.

Prior to bonding the sub-sectors 70 to the second layer 52 of the tile 10, the sub-sectors 70 are preferably squeezed against each other in their sequential order and are maintained in that squeezed configuration by retaining nodes 75 made at the extremities of the wire 74 kept in tension there between, as seen in phantom lines in FIG. 7. At this point, the unused section of the wire 74 is chopped off and discarded. In order to hide these retaining nodes 75 protruding from the corresponding sub-sector auxiliary side surface 80, 82, end sub-sector 70a defining a cavity for housing the retaining node 75 therein are bonded to the last sub-sector 70.

Although the bamboo tile 10 depicted in FIGS. 1 and 6 has a generally square-shaped preferred configuration, it should be understood that to any tile shape, such as a rectangular-shaped configuration 10a illustrated in FIG. 1, can be made without departing from the scope of the present invention.

As it is well known in the art of wooden based products, the first layer external surface 56 of the bamboo tile 10 can be slightly sanded to smooth it off and to prepare the external surface 56 for a finishing operation such as the application of a colored or tinting and/or a varnishing agent thereon.

The present invention also refers to a method for manufacturing the bamboo tile 10 hereinabove described. The method includes the steps of:

a) axially splitting the bamboo stem section 20 into the plurality of sequential and adjacent generally elongated sectors 30;

b) sequentially disposing the elongated sectors 30 in parallel relationship relative to each other with the sector first auxiliary surface 36 of each sector being in abutment contact with the sector second auxiliary surface 38 of an adjacent sector 30 to form a tile first layer 50. The external surface 56 of the first layer 50 being formed by the sector first main surfaces 32 of the sectors 30 positioned so as to substantially integrally reproduce at least a portion of the outside surface 24 of the bamboo stem section 20;

c) bonding the internal surface 54 of the first layer 50 on the tile second layer 52 using the glue 51. The rigid and flat second layer 52 supports the first layer so as to rigidify the bamboo tile 10. Typically the glue 51 is spread onto the internal surface 54 of the first layer in sufficient quantity to ensure that it fully fills in the interstitial void cavities 55 between the different sectors 30, between the two layers 50, 52 as well as within the sectors 30 between the fibers with excess quantity reaching the external surface 56 thereof when the two layers 50, 52 are to pressured against each other (the excess being obviously wiped off to keep the external surface 56 clean); and d) making the chamfer 60 between the external surface 56 of the first layer 50 and at least one of the peripheral surfaces 58.

The above step b) preferably includes the steps of:

b1) providing the retaining means for maintaining the sectors 30 in the sequential and substantially parallel relationship relative to each other, in the preferably slightly separated relationship from each other and not necessarily in abutment against each other, as illustrated in FIG. 5. The retaining means preferably being the wire 74 that engages the transversal through bores 72 of the successive sectors 30;

b2) axially splitting each elongated sector 30 into the plurality of sequential and adjacent generally elongated sub-sectors 70. The sub-sectors 70 being maintained in sequential and substantially parallel relationship relative to each other by the wires 74; and b3) sequentially disposing the elongated sub-sectors 70 in parallel relationship relative to each other with the sub-sector first auxiliary surface 80 of each sub-sector 70 being in abutment contact with the sub-sector second auxiliary surface 82 of an adjacent sub-sector 70 to form the tile first layer 50. The external surface 56 being formed by the sub-sector first main surfaces 76 of the sub-sectors 70 positioned so as to substantially integrally reproduce at least a portion of the outside surface 24 of the bamboo stem section 20.

Preferably, the above step a) includes facing out the node(s) 22 on the sector first main surface 32 of each sector 30 so as to render that sector first main surface 32 substantially flat.

Preferably, the above step c) includes facing the internal surface 54 of the first layer 50 so as to ensure a generally flat internal surface 54 prior to bonding the same to the tile second layer 52.

Preferably, the above step d) includes trimming the peripheral surfaces 58 of the tile 30 to the required dimensions thereof.

Once the manufacturing method of the bamboo tile 10 of the present invention is substantially completed, the external surface 56 of the first layer 50 of the tile 10 can be slightly sanded depending on the desired specific external appearance of the bamboo tile 10.

Also, the external surface 56 could have some finish being applied thereon such as either the application of a coloring or tinting agent, or the application of a varnishing agent, again depending on the specific required decorative final appearance.

Since it is so obvious in the art and sometimes even required by the applicable building construction code or the like related to wood based products, the above method does not mention any step of kiln drying the bamboo sectors 30 and/or preferably the entire tile 10, preferably under pressure, to eliminate its sugar content to prevent any undesirable insect infestation and deterioration of the integrity of the bamboo product, as well as problems such as discoloration of the bamboo product over time, cracking or warping thereof when exposed to variations in temperature and humidity.

Although the present bamboo tile and its manufacturing method have been described with a certain degree of particularity, it is to be understood that the disclosure has been made by way of example only and that present invention is not limited to the features of the embodiments described and illustrated herein, but includes all variations and modifications within the scope of the present invention as hereinafter claimed.

I claim:

1. A bamboo tile for covering a structure wall and presenting a natural surface texture of a longitudinal section of a bamboo stem with at least one node, said section defining generally cylindrical outside and inside surfaces and a generally central axis, said section being axially split into a plurality of sequential and adjacent generally elongated sectors, each of said sectors having a generally parallelepiped-shaped configuration and defining a sector first main surface, a sector second main surface, a sector first auxiliary surface, an opposed sector second auxiliary surface, a sector first side surface, an opposed sector second side surface and a sector longitudinal axis, said bamboo tile comprising:

a first layer defining opposed generally planar internal and external surfaces, said first layer being formed by said elongated sectors sequentially disposed in generally parallel relationship relative to each other with said sector first auxiliary surface of each sector being in abutment contact with said sector second auxiliary surface of an adjacent sector, said external surface being formed by said sector first main surfaces of said sectors positioned to integrally reproduce the natural texture of said outside cylindrical surface of said bamboo stem section developed into said generally planar external surface, each of said sectors defining at least one through bore extending from said sector first auxiliary surface to said sector second auxiliary surface, said through bores of said adjacent sectors being substantially in register with each other;

a retaining wire inserted into said through bores of said successive sectors to maintain said sectors in said sequential relationship relative to each other so as to allow said generally planar external surface to integrally reproduce the natural texture of the outside cylindrical surface of the bamboo stem section developed thereinto.

2. The bamboo tile of claim 1, further including:
a second layer bonded on said internal surface of said first layer, said second layer supporting said first layer so as to rigidify said bamboo tile, said first and second layers defining common peripheral surfaces; and
a chamfer extending between said external surface of said first layer and one of said peripheral surfaces.

3. The bamboo tile of claim 2, wherein said chamfer extends between said external surface of said first layer and two of said peripheral surfaces.

4. The bamboo tile of claim 3, wherein said two of said peripheral surfaces are opposed to each other.

5. The bamboo tile of claim 2, wherein said chamfer extends between said external surface of said first layer and said peripheral surfaces.

6. The bamboo tile of claim 1, wherein each of said sectors defines a sector thickness between said sector first main surface and said sector second main surface, said sector thickness continuously varying along said peripheral surfaces of said bamboo tile.

7. The bamboo tile of claim 1, wherein each of said sectors defines a sector width between said sector first auxiliary surface and said sector second auxiliary surface, said sector width varying between about 1 mm and about 10 mm.

8. The bamboo tile of claim 7, wherein said sector width varies between about 2 mm and about 5 mm.

9. The bamboo tile of claim 1, wherein said bamboo tile has a generally square-shaped configuration.

10. The bamboo tile of claim 1, wherein said bamboo tile has a generally rectangle-shaped configuration.

11. A method for manufacturing a bamboo tile for covering a structure wall, said bamboo tile presenting a natural surface texture of a longitudinal section of a bamboo stem with at least one node, said section defining generally cylindrical outside and inside surfaces and a generally central axis, said method comprising the steps of:

a) axially splitting said section into a plurality of sequential and adjacent generally elongated sectors, each of said sectors having a generally parallelepiped-shaped configuration and defining a sector first main surface, a sector second main surface, a sector first auxiliary surface, an opposed sector second auxiliary surface, a sector first side surface, an opposed sector second side surface and a sector longitudinal axis;

b) sequentially disposing said elongated sectors in parallel relationship relative to each other with said sector first auxiliary surface of each sector being in abutment contact with said sector second auxiliary surface of an adjacent sector to form a tile first layer, said first layer defining opposed generally planar internal and external surfaces, said external surface being formed by said sector first main surfaces of said sectors positioned to integrally reproduce the natural texture of said outside cylindrical surface of said bamboo stem section developed into said generally planar external surface;

c) bonding said internal surface of said first layer on a tile second layer, said second layer supporting said first layer so as to rigidify said bamboo tile, said first and second layers defining common peripheral surfaces; and d) making a chamfer between said external surface of said first layer and one of said peripheral surfaces.

12. The method of claim 11, wherein step d) includes making a chamfer between said external surface of said first layer and two of said peripheral surfaces.

13. The method of claim 12, wherein said two of said peripheral surfaces are opposed to each other.

14. The method of claim 11, wherein step d) includes making a chamfer between said external surface of said first layer and said peripheral surfaces.

15. The method of claim 11, wherein each of said sectors defines at least one through bore extending from said sector first auxiliary surface to said sector second auxiliary surface, said through bores of said adjacent sectors being substantially in register with each other, and wherein step b) comprises the steps of:

b1) inserting a retaining wire through said through bores of said successive sectors to maintain said sectors in said sequential relationship relative to each other;

b2) axially splitting each of said elongated sectors into a plurality of sequential and adjacent generally elongated sub-sectors, each of said sub-sectors having a generally parallelepiped-shaped configuration and defining a sub-sector first main surface, a sub-sector second main surface, a sub-sector first auxiliary surface, an opposed sub-sector second auxiliary surface, a sub-sector first side surface and an opposed sub-sector second side surface, said sub-sectors being maintained in sequential and substantially parallel relationship relative to each other by said retaining wire; and b3) sequentially disposing said elongated sub-sectors in parallel relationship relative to each other with said sub-sector first auxiliary surface of each sub-sector being in abutment contact with said sub-sector second auxiliary surface of an adjacent sub-sector to form said tile first layer, said external surface being formed by said sub-sector first main surfaces of said sub-sectors positioned to integrally reproduce the natural texture of said outside cylindrical surface of said bamboo stem section developed into said generally planar external surface.

16. The method of claim 11, wherein step c) includes facing said internal surface of said first layer so as to ensure a generally flat internal surface prior to bonding said internal surface of said first layer on a tile second layer.

17. The method of claim 16, further comprising the step of:
   e) sanding and/or drying said bamboo tile.

18. The method of claim 17, further comprising the step of:
   f) finishing said first layer external surface of said bamboo tile by applying tinting and/or varnishing agent thereon.

19. The method of claim 11, wherein step a) includes facing out said node on said sector first main surface of each of said elongated sectors so as to render said sector first main surface substantially flat.

20. A method for manufacturing a bamboo tile for covering a structure wall, said bamboo tile presenting a natural surface texture of a longitudinal section of a bamboo stem with at least one node, said section defining generally cylindrical outside and inside surfaces and a generally central axis, said method comprising the steps of:
   a) axially splitting said section into a plurality of sequential and adjacent generally elongated sectors, each of said sectors having a generally parallelepiped-shaped configuration and defining a sector first main surface, a sector second main surface, a sector first auxiliary surface, an opposed sector second auxiliary surface, a sector first side surface, an opposed sector second side surface and a sector longitudinal axis;
   b) sequentially disposing said elongated sectors in parallel relationship relative to each other with said sector first auxiliary surface of each sector being in abutment contact with said sector second auxiliary surface of an adjacent sector to form a tile first layer, said first layer defining opposed generally planar internal and external surfaces, said external surface being formed by said sector first main surfaces of said sectors positioned to integrally reproduce the natural texture of said outside cylindrical surface of said bamboo stem section developed into said generally planar external surface, each of said sectors defining at least one through bore extending from said sector first auxiliary surface to said sector second auxiliary surface, said through bores of said adjacent sectors being substantially in register with each other; and
   e) inserting a retaining wire through said through bores of said successive sectors to maintain said sectors in said sequential relationship relative to each other so as to allow said generally planar external surface to integrally reproduce the natural texture of the outside cylindrical surface of the bamboo stem section developed thereinto.

21. The method of claim 20, further comprising the step of:
   d) bonding said internal surface of said first layer on a tile second layer, said second layer supporting said first layer so as to rigidify said bamboo tile, said first and second layers defining common peripheral surfaces.

* * * * *